United States Patent [19]

de Cleur et al.

[11] 4,248,978

[45] Feb. 3, 1981

[54] PULVERULENT COATING COMPOSITION

[75] Inventors: Eckhard de Cleur, Duisburg; Rolf Dhein, Krefeld; Hans Rudolph, Krefeld; Hans J. Kreuder, Krefeld; Hanns P. Müller, Leverkusen; Walter Schäfer, Cologne; Kuno Wagner, Leverkusen; Kurt Findeisen, Odenthal, all of Fed. Rep. of Germany

[73] Assignee: Bayer Aktiengesellschaft, Leverkusen, Fed. Rep. of Germany

[21] Appl. No.: 35,220

[22] Filed: May 2, 1979

[30] Foreign Application Priority Data

May 5, 1978 [DE] Fed. Rep. of Germany ....... 2819827

[51] Int. Cl.³ .............................................. C08L 75/00
[52] U.S. Cl. .................................... 525/124; 525/403; 525/424; 525/440; 525/467; 525/504; 525/509; 525/528; 528/75
[58] Field of Search ................. 260/239 AR; 528/75; 525/124, 403, 424, 440, 504, 528, 467, 509

[56] References Cited

U.S. PATENT DOCUMENTS

| 3,168,483 | 2/1965 | Beitchmon et al. | 260/239 AR |
| 3,214,412 | 10/1965 | Brown | 528/75 |
| 3,489,744 | 1/1970 | Schwarcz et al. | 260/239 AR |
| 3,564,041 | 2/1971 | Farrissey | 260/239 AR |

FOREIGN PATENT DOCUMENTS 1147383  4/1969  United Kingdom ...................... 528/75

*Primary Examiner*—Lewis T. Jacobs
*Attorney, Agent, or Firm*—Connolly and Hutz

[57] ABSTRACT

Compounds having a melting point above 40° C. which compounds contain uretone imine groups and which are substantially free from volatile isocyanate blocking agents which are split off under stoving conditions are excellent crosslinking agents for pulverulent coating compositions based on hydroxyl groups-containing polymers.

1 Claim, No Drawings

PULVERULENT COATING COMPOSITION

This invention relates to a pulverulent coating composition containing a uretone imine or polyuretone imine as cross-linking component.

Binders for pulverulent coating compositions generally consist mainly of an oligomer or polymer containing functional groups as the first component and a cross-linking agent capable of reacting with the functional groups of the oligomer or polymer under stoving conditions as the second component.

Pulverulent coating compositions which contain blocked polyisocyanates as cross-linking agents have long been known (German Auslegeschrift Nos. 1,957,483; 2,064,098; 2,215,080). These blocked polyisocyanates have the desired advantage that they do not react with the reactive groups of the first component at room temperature or slightly elevated temperature, but rapidly split off the blocking agent under stoving conditions and then fulfil the intended cross-linking function thereof by reacting with the first component.

The preparation of blocked polyisocyanates is known (see, e.g., Houben-Weyl, Methoden der Organischen Chemie, Volume XIV/2, 4th Edition, publishers Georg Thieme Verlag, Stuttgart 1963, pages 61–70), but of the numerous blocking agents for organic polyisocyanates described in the literature, only few have achieved any position of technical importance. For solvent-containing stoving lacquers, it is customary to mask using malonic acid esters and acetoacetic acid esters (e.g. Belgian Pat. No. 756,058) while prior art cross-linking agents for powder lacquers are generally blocked using lactams or phenols (e.g. German Auslegeschrift No. 1,957,483 and East German Pat. No. 55,820).

None of these compounds ideally fulfils the conditions demanded of masking agents. Although malonic and acetoacetic esters split off at low temperatures (e.g. from 120° to 130° C./30 minutes), they must be used in large quantities, by weight, on account of the relatively high molecular weights thereof, or, in other words, the proportion, by weight, of masked isocyanate groups is considerably reduced. Moreover, there is often no resistance to yellowing under stoving conditions when such systems are employed. The use of phenols as blocking agents is restricted on account of the physiological properties and unpleasant odour thereof, while ε-caprolactam used as blocking agent requires high stoving temperatures (e.g. at least 160° C./30 minutes) for complete cross-linking.

One peculiarity of the electrostatic powder spray process is that thicker layers are formed in some areas (e.g. on horizontal surfaces and in corners and angles) than on the remainder of the substrate. As soon as the thickness of the layer exceeds a certain limit, generally from 120 to 150 mμ, surface faults appear when these areas are stoved. As a result, it frequently occurs that an article which on the whole has an excellent coating is found to have a faulty lacquer in some areas, usually due to the formation of blisters.

It has now been found that extremely high quality pulverulent coating compositions are obtained by using, as cross-linking agent, compounds having a melting point above 40° C. which contain uretone imine groups and which are substantially free from volatile isocyanate blocking agents which are split off under stoving conditions. These coating compositions according to the present invention have the advantage that, even when applied in thick layers, they produce lacquers having virtually ideal fault-free surfaces and a high resistance to yellowing. The fact that no blocking agents are released during the stoving process is an inestimable advantage. It eliminates the possibility of physiological irritation to the operator and obviates the need for apparatus to remove unpleasant odours and moreover, the manufacturer need on the whole pay only for those components which are 100% incorporated in the cross-linking lacquer system.

In connection with the present invention, it was necessary, inter alia, to overcome the preconceived idea that uretone imines and polyuretone imines would be unsuitable for use as cross-linking agents for powder lacquers because they would undergo the premature reaction.

Frequent previous attempts have been made to overcome the risk of premature reaction of pulverulent coating compositions by more or less completely blocking the reactive groups of the cross-linking component. The present invention, on the other hand, involves blocking a polyisocyanate, preferably a diisocyanate, with a carbodiimide or polycarbodiimide, preferably an isocyanate-group-containing carbodiimide, or polycarbodiimide, with itself to form products which contain uretone imine groups and these uretone imine groups may in turn enter, as new reactive groups, into a reaction with the component which is to be cross-linked.

The binders according to the present invention are surprisingly stable in storage, bearing in mind that uretone imines are known to be highly reactive (J.Org. Chem. 33, 1913). A binder containing hydroxyl groups, for example, may be stored for more than 8 weeks at 40° C. without showing any signs of cross-linking even when compounded in the extruder. The present invention thus relates to binders for pulverulent coating compositions comprising:

(a) from 25 to 95%, by weight, preferably from 50 to 95%, by weight, of at least one monomer, oligomer or polymer having hydroxyl, carboxyl, mercapto, amino, amide, urethane, urea or thiourea groups and having a glass-transition of from 40° to 200° C. (determined by differential thermoanalysis); and (b) from 5 to 75%, by weight, preferably from 5 to 50%, by weight, of at least one blocked polyisocyanate having a melting point of from 40° to 220° C., preferably from 60° to 80° C.; the percentages of (a) and (b) always adding up to 100, characterised in that the cross-linking agent (b) contains at least one uretone imine group per molecule.

Preferred cross-linking agents (b) contain:

from 0.5 to 35%, by weight, preferably from 0.5 to 26%, by weight of uretone imine groups;

from 0 to 27%, by weight, of free isocyanate groups; and from 0 to 30%, by weight, preferably up to 27%, by weight, of carbodiimide groups;

these percentages being based in all cases on the weight of the cross-linking agent (b).

Uretone imines are known. They may be prepared by 2+2-cycloaddition of isocyanates to carbodiimides (German Pat. No. 1,012,601; German Auslegeschrift No. 1,568,501; and German Offenlegungsschrift Nos. 2,504,400; 2,523,586; 2,537,685; 2,552,340 and 2,552,350; Angew. Chem. 74, 801 (1962); J. Org.Chem. 33, 1913 (1968); J. Elastoplastics 4, 259 (1972)).

In principle, various isocyanates may be chemically added to carbodiimides, but if the simplicity of a onepot reaction is desired, there is the possibility of blocking isocyanate group-containing carbodiimides with themselves, i.e. each molecule with the carbodiimide groups of the next molecule. If this, generally preferred, embodiment is employed, it is, of course, necessary to ensure that the carbodiimidisation reaction of the polyisocyanates, which is generally catalysed, is stopped in good time before all the free isocyanate groups have reacted. At the present time, this often entails difficulties in the case of aromatic polyisocyanates so that these compounds are not suitably used alone for the preparation of the uretone imines to be used according to the present invention.

The conversion of isocyanates to carbodiimides is known (German Offenlegungsschrift Nos. 2,245,634; 2,504,400; 2,556,760 and 2,624,198; U.S. Pat. Nos. 2,663,737; 2,663,738; 2,663,739; 2,853,473 and 2,941,966). Stopping the reaction, especially in the case of non-aromatic isocyanates, may, in principle, be carried out by cooling or by converting the catalyst into a catalytically inactive reaction product.

In some cases, especially when working without carbodiimidisation catalysts or with very slowly reacting isocyanates or weak catalysts, the risk of cross-linking agent containing to condense and release carbon dioxide when the powder lacquer components are mixed in the extruder may be reduced by continuing the carbodiimidisation reaction at a temperature of from 20° to 40° C. above the reaction temperature of the extruder until the evolution of carbon dioxide has virtually ceased.

The uretone imines are in most cases formed spontaneously from the isocyanate group-containing carbodiimides or isocyanate/carbodiimide mixtures on cooling. Copper salts act catalytically on this ring formation.

The uretone imines and polyuretone imines used as cross-linking agents (b) according to the present invention may therefore generally be prepared by reacting organic polyisocyanates, preferably diisocyanates, at a temperature from 80° to 220° C., optionally in the presence of, e.g. from 0.001 to 5%, by weight, based on the polyisocyanate, of a carbodiimidisation catalyst until from 40 to 90% of the isocyanate groups have undergone reaction (as measured by the quantity of carbon dioxide evolved) and then converting the reaction product into the corresponding uretone imines or polyuretone imines by cooling, optionally in the presence of from 0.05 to 1%, by weight, based on the free isocyanate groups, of a ring-forming catalyst.

The isocyanates used as starting materials for the preparation of the uretone imines to be used according to the present invention may be the known aliphatic, cycloaliphatic or araliphatic diisocyanates of polyurethane chemistry, e.g. 2,4,4-trimethyl-1,6-diisocyanatohexane, 2,2,4- and 1,4-tetra-, 1,5-penta- and 1,6-hexa-,1,11-undeca- and 1,12-dodeca-methylene diisocyanate, 1,2-diisocyanatomethyl cyclobutane, 1,4-diisocyanto cyclohexane, dicyclohexyl-diisocyanate, dicyclohexylmethane-4,4'-diisocyanate, p and m-xylylene diisocyanate, 1-methyl-2,4'-diisocyanato-cyclohexane, 1-methyl-2,6-diisocyanato-cyclohexane, 3-isocyanatomethyl-3,5,5-trimethyl-cyclohexylisocyanate (isophorone diisocyanate) and α,ω-diisocyanato-caproic acid esters having from 1 to 8 carbon atoms in the alcohol moiety.

Alicyclic isocyanates are particularly suitable, e.g. 1-isocyanato-3,3,5-trimethyl-5-isocyanatomethyl-cyclohexane; cyclohexane-1,4-diisocyanate; 4,4'-diisocyanato-dicyclohexyl-methane; and an 80:20 mixture of 2,4- and 2,6-diisocyanato-1-methylcyclohexane. The following are also suitable; hexamethylene diisocyanate, 2,2,4- and 2,4,4-trimethyl-hexamethylene-diisocyanate, diisocyanates which are based on hexamethylene diisocyanate and 1-isocyanato-3,3,5-trimethyl-5-isocyanatomethyl-cyclohexane and contain oxadiazinetrione groups and/or uretdione groups and mixtures of these compounds.

The uretone imines to be used according to the present invention may also be prepared from mixtures of aliphatic or cycloaliphatic isocyanates and up to 30 mol % of aromatic diisocyanates.

The following are examples of preferred aromatic diisocyanates: 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, the diisocyanates described in U.S. Pat. No. 3,492,330 and polyisocyanates containing allophanate groups as described, e.g., in British Pat. No. 994,890, Belgian Pat. No. 761,626 and published Dutch Pat. Application No. 7,102,524.

It is also possible, in principle, to use aromatic or aliphatic diisocyanates of the type known in polyurethane chemistry as "modified isocyanates" or "isocyanate prepolymers" which may be obtained by the reaction of excess diisocyanate with difunctional compounds containing OH or NH groups. Aliphatic diisocyanates may be used as all or part of the isocyanate component and aromatic diisocyanates only as part of the isocyanate component. The inclusion of such modified isocyanates enables other variations of the uretone imines used according to the present invention to be prepared, depending on the choice of the chain length or chemical nature of the OH and NH compounds, e.g. glycol, diglycol, polyether, polycarbonates or polyesters.

Minor quantities of Zerewitinoff active compounds which react more rapidly with isocyanate groups than with carbodiimide and uretone imine groups or monoisocyanates may also be added before, during or after carbodiimidisation in order to block isocyanate groups or influence the melting point or molecular weight. Examples of preferred Zerewitinoff active compounds include: methanol, ethanol, cyclohexanol, phenol, mercaptans, aniline, 1,2,4-triazole ε-caprolactam, pyrrolidone, diethyl malonate aind ethyl acetoacetate. Suitable monoisocyanates include, for example, hexyl isocyanate, cyclo hexyl isocyanate, phenyl isocyanate and tolyl isocyanate. The uretone imines to be used according to the present invention may be prepared by, for example, heating the diisocyanates to temperatures of from 80° to 250° C., optionally together with a sub-equivalent quantity of Zerewitinoff active compounds or with monoisocyanates (proportion of Zerewitinoff active compounds or monoisocyanates to diisocyanates < 1:1) in the presence of a carbodiimidisation catalyst until from 40 to 90% of the isocyanate groups have been converted to carbodiimide groups with evolution of carbon dioxide, carbodiimidisation being then stopped by cooling to room temperature.

The quantity of carbon dioxide formed during carbodiimidisation, which may easily be measured by means of a gasmeter, is equivalent to the theoretical carbodiimide content. The difference between this and the uretone imine content give the true carbodiimide content. The uretone imine content may be calculated from the difference between the isocyanate content at room temperature and the isocyanate content at 180° C.

The isocyanate content is determined in the conventional manner from the consumption of di-n-butylamine.

The carbodiimide-forming catalysts used for preparing the polyisocyanatocarbodiimide addition products to be used according to the present invention may be selected from the catalysts commonly used for the conversion of isocyanate groups to carbodiimide groups. Examples include: compounds which contain phosphorus, such as triphenylphosphine oxide, pholine oxide and phospholane oxide and sulphides thereof, and compounds which have been described, e.g. in U.S. Pat. Nos. 2,663,737; 2,663,738; 2,663,739 and 2,853,473.

The carbodiimidisation catalyst preferably used is a mixture of 1-methyl-1-phospha-2-cyclopenten-1-oxide and 1-methyl-1-phospha-3-cyclopenten-1-oxide, which is generally added to the isocyanate in quantities of from 0.1 to 5%, by weight. The reaction temperature is generally from 80° to 180° C.

The production of cross-linking agents to be used according to the present invention is preferably carried out in the absence of solvent, but may also be carried out in a solvent, such as toluene, xylene or decalin, but the solvent must be removed after the reaction by suitable methods.

One advantage is that starting from one and the same isocyanate, the melting point may be varied as required within a wide range by the extent of carbodiimidisation.

The uretone imines used according to the present invention may be milled or pulverised and may be homogeneously distributed in the reactants in this form. One great advantage is that the polyisocyanatocarbodiimide addition products to be used according to the present invention are reactive powders which are capable of entering into clearly defined cross-linking reactions with the reactants and split off little or no blocking agent in the process. Suitable for use as reactants (a) are compounds carrying functional groups which react with uretone imine, carbodiimide and isocyanate groups according to the reaction temperature, e.g. hydroxyl, carboxyl, mercapto, amino, amide, urethane or (thio)urea groups. Reactants (a) may be polymers, particularly polycondensates or polyaddition compounds.

The preferred components (a) are mainly polyethers, polythioethers, polyacetals, polyamides, polyester amides and epoxide resins having hydroxyl groups in the molecule, phenol/formaldehyde resins, aminoplasts and modification products thereof with polyhydric alcohols, aniline/formaldehyde resins, polyazomethines, polyurethanes, polyureas and polythioureas, polysulphonamides, melamine derivatives, cellulose esters and ethers, partially saponified homo- and co-polymers of vinyl esters, partially acetalised polyvinyl alcohols, but most preferably polyesters and acrylate resins.

The polymers having hydroxyl groups, which are the most important of these reactants, generally have hydroxyl numbers of from 20 to 400, preferably from 30 to 140, mg of KOH/g.

Preferred components (a) are mentioned in the following list:

Preferred carboxylic acids for the preparation of polyesters (a) may be aliphatic, cycloaliphatic, aromatic and/or heterocyclic and they may be substituted one or more times, e.g. by halogen atoms, and/or may be unsaturated. The following are examples: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, di- and tetra-chlorophthalic acid, endomethylene tetrahydrophthalic acid and its hexachloro-derivative, glutaric acid, maleic acid, fumaric acid and, where obtainable, the anhydrides thereof: dimeric and trimeric fatty acids optionally mixed with monomeric fatty acids such as oleic acid; terephthalic acid dimethyl ester, terephthalic acid-bis-glycol ester and cyclic monocarboxylic acids, such as benzoic acid, tertiary-butyl benzoic acid or hexahydrobenzoic acid. The following are examples of suitable polyhydric alcohols: ethylene glycol, propylene glycol-(1,2) and -(1,3), butylene glycol-(1,4) and -(2,3), di-$\beta$-hydroxyethylbutane diol, hexane diol-(1,6), octane diol-(1,8), neopentyl glycol, cyclohexane diol, 1,4-bis-(hydroxymethyl)-cyclohexane, 2,2-bis-[4-hydroxycyclohexyl]-propane, 2,2-bis-[4-[$\beta$-hydroxyethoxy)-phenyl]-propane, 2-methyl-1,3-propane diol, glycerol, trimethylolpropane, hexane triol-(1,2,6), butane triol-(1,2,4), tris-($\beta$-hydroxyethyl)-isocyanurate, trimethylolethane, pentaerythritol, quinitol, mannitol, sorbitol, formose and hydroxyalkylation products thereof, methyl glycoside, diethylene glycol, triethylene glycol; tetraethylene glycol, higher polyethylene glycols, dipropylene glycol, tripropylene glycol, higher polypropylene glycols, dibutylene glycol, higher polybutylene glycols and xylylene glycol. The polyesters may also have carboxyl end groups. Mono- and poly-esters of lactones, such as $\epsilon$-caprolactone, or hydroxy carboxylic acids, $\omega$-hydroxycaproic acid and thioglycollic acid, may also be used. Polyesters of the above-mentioned polycarboxylic acids or derivatives thereof and polyphenols, such as hydroquinone, bisphenol-A, 4,4'-dihydroxydiphenyl or bis-(4-hydroxyphenyl)-sulphone; polyesters modified with fatty acids ("oil alkyds") and naturally occurring saturated or unsaturated polyesters, degradation products thereof or trans-esterification products thereof with polyols, such as castor oil, tall oil, soya oil or linseed oil; polyesters of carbonic acid which are obtainable from hydroquinone, diphenylol-propane, p-xyxlylene glycol, ethylene glycol, butane diol or hexane diol-1,6 and other polyols by the conventional condensation reactions, e.g. using phosgene or diethyl or diphenylcarbonate, or from cyclic carbonates, such as glycol carbonate or vinylidene carbonate, by polymerisation in known manner; polyesters of silicic acid, e.g. from dimthyldichlorosilane and polyhydric alcohols or phenols of the type mentioned above; polyesters of phosphoric acids, e.g. of methane, ethane, $\beta$-chloroethane, benzene or styrene phosphonic acids or -phosphonic acid chloride or -phosphonic acid ester, and polyhydric alcohols or phenols of the type mentioned above; polyesters of phophorous acid obtained from phosphorous acid itself or phosphorous acid esters, ester amides or ester chlorides and polyhydric alcohols, polyether alcohols and polyphenols; polyesters of phosphoric acid, e.g. those obtained by oxidation of polyesters of phosphorous acid or by ester interchange of phosphoric acid esters with polyhydric alcohols or phenols; polyesters of boric acid; polysiloxanes, for example the products obtainable by the hydrolysis of dialkane dichlorosilanes with water, followed by treatment with polyhydric alcohols or by the chemical addition of polysiloxane dihydrides to olefins, such as allyl alcohol or acrylic acid.

Preferred polyesters include, for example, the reaction products of polycarboxylic acids and glycidyl compounds described, for example in German Offenlegungsschrift No. 2,410,513.

Examples of suitable glycidyl compounds include:

esters of 2,3-epoxy-1-propanol with monobasic acids which have from 4 to 18 carbon atoms, such as glycidyl palmitate, glycidyl laurate and glycidyl stearate; alkylene oxides having from 4 to 18 carbon atoms, such as butylene oxide;

and glycidyl ethers, such as oxtyl glycidyl ether.

The dicarboxylic acids used in this process may be one of the polycarboxylic acids mentioned below under (II). Monocarboxylic acids exemplified under III may also be used.

Also to be included among the preferred components (a) are monomeric esters, e.g. dicarboxylic acid-bis-(hydroxy- alkyl)esters, monocarboxylic acid esters of higher than divalent polyols and oligoesters having molecular weights of from 200 to 1000, preferably below 600, which may be prepared from the conventional raw materials of lacquer chemistry by condensation reactions. The following are examples of such compounds:

(I) Alcohols having from 2 to 24, preferably from 2 to 10, carbon atoms and from 2 to 6 OH groups attached to non-aromatic carbon atoms, e.g. ethylene glycol, propylene glycols, diethylene glycol, dipropylene glycol, butane diols, neopentyl glycols, hexane diols, hexane triols, perhydrobisphenol, dimethylolcyclohexane, glycerol, trimethylolethane, trimethylolpropane, pentaerythritol, dipentaerythritol and mannitol;

(II) Di- and higher poly-carboxylic acids having from 4 to 36 carbon atoms and from 2 to 4 carboxyl groups and derivatives thereof which are capable of esterification, such as anhydrides and esters, e.g. phthalic acid(anhydride), isophthalic acid, terephthalic acid, hexahydroterephthalic acid, hexahydroisophthalic acid, alkyltetrahydrophthalic acid, endomethylene tetrahydrophthalic acid anhydride, adipic acid, succinic acid, maleic acid, fumaric acid, dimeric fatty acids, trimellitic acid, pyromellitic acid and azelaic acid;

(III) Monocarboxylic acids having from 6 to 24 carbon atoms, e.g. caprylic acid, 2-ethylhexanoic acid, benzoic acid, p-t-butyl-benzoic acid, hexahydrogenzoic acid, monocarboxylic acid mixtures of natural oils and fats, such as coconut oil fatty acid, soya oil fatty acid, ricinene fatty acid, hydrogenated and isomerised fatty acids, and mixtures thereof, which fatty acids may also be used as glycerides and undergo ester interchange and/or dehydration in the reaction;

(IV) Monohydric alcohols having from 1 to 18 carbon atoms, e.g. methanol, ethanol, isopropanol, cyclohexanol, benzyl alcohol, isodecanol, nonanol, octanol, and oleyl alcohol.

The polyesters may also be obtained by the known method of condensation in an inert gas atmosphere at temperatures of from 100° to 260° C., preferably from 130° to 220° C., in the solvent-free state or by an azeotropic method, e.g. as described in Methoden der Organischen Chemie (Houben-Weyl), Volume 14/2, 1–5, 21–23, 40–44, Georg Thieme Verlag, Stuttgart, 1963, or in "Alkyd Resins" by C. R. Martens, 51–59, Reinhold Plastics Appl. Series, Reinhold Publishing Comp., New York, 1961.

The preferred polycarbonates are those which may be prepared by, for example, the reaction of diols, such as propane diol-(1,3), butane diol-(1,4) and/or hexane diol-(1,6), di-, tri- or tetra-ethylene glycol with diaryl carbonates, e.g. diphenyl carbonate or with phosgene.

The preferred acrylate resins for use as component (a) are homo- or co-polymers having at least two hydroxyl groups per molecule, obtained e.g. from the following monomers as starting materials:

esters of acrylic acid and methacrylic acid with dihydric saturated, aliphatic alcohols having from 2 to 4 carbon atoms, e.g. 2-hydroxyethyl acrylate, 2-hydroxypropyl acrylate, 4-hydroxybutyl acrylate and the corresponding methacrylic acid esters; acrylic and methacrylic acid;

acrylic and methacrylic acid alkyl esters having from 1 to 18, preferably from 1 to 8, carbon atoms in the alcohol component, e.g. methyl acrylate, ethyl acrylate, propyl acrylate, isopropyl acrylate, n-butyl acrylate, t-butyl acrylate, 2-ethyl-hexyl-acrylate, stearyl acrylate and the corresponding methacrylic acid esters; acrylic and methacrylic acid cyclohexyl esters; acrylonitrile and methacrylonitrile; acrylamide and methacrylamide; N-methoxymethyl(meth)acrylic acid amide.

Particularly preferred acrylate resins are the copolymers of:

(a) from 0 to 50%, by weight, of monoesters of acrylic or methacrylic acid with dihydric or higher polyhydric alcohols, such as butane diol-(1,4)-monoacrylate, hydroxypropyl(meth)acrylate, diethylene glycol monoacrylate or hydroxyethyl(meth)acrylate; or vinyl glycol, vinyl thioethanol, allyl alcohol or butane diol-(1,4)-monovinyl ether;

(b) from 5 to 95%, by weight, of esters of acrylic acid or methacrylic acid with monohydric alcohols having from 1 to 12 carbon atoms, e.g. methylmethacrylate, ethyl acrylate, n-butyl acrylate or 2-ethylhexyl acrylate;

(c) from 0 to 50% by weight of aromatic vinyl and vinylidene compounds, such as styrene, α-methylstyrene or vinyl toluene;

(d) from 0 to 20%, by weight, of other monomers carrying functional groups, e.g. acrylic acid, methacrylic acid, crotonic acid, itaconic acid, maleic acid, fumaric acid, maleic acid anhydride, maleic acid semiesters, acrylamide, methacrylamide, acrylonitrile or N-methanol(meth)acrylamide and glycidyl(meth)acrylate. In these copolymers, the proportion of group (a) and/or (d) should be at least 5%, by weight.

The acrylate resins may be prepared by the conventional methods, i.e. by solution, suspension, emulsion or precipitation polymerisation, but it is preferred to employ the method of solvent-free polymerisation, which may be initiated by UV light.

Other polymerisation initiators which may be used include the conventional peroxides and azo compounds, such as dibenzoyl peroxide, t-butyl perbenzoate or azodiisobutyonitrile. The molecular weight may be regulated, for example by using sulphur compounds, such as t-dodecylmercaptan.

The preferred polyethers (a) have at least two, generally from two to eight, preferably two or three hydroxyl groups and they may be prepared by, for example, the polyaddition of epoxides, such as ethylene oxide, propylene oxide, butylene oxide, trimethylene oxide, 3,3-bis-(chloromethyl)-oxacyclobutane, tetrahydrofuran, styrene oxide, the bis-(2,3-epoxypropyl) ether of diphenylolpropane or epichlorohydrin, either each on its own, e.g. in the presence of $BF_3$ or by addition of these epoxides, optionally as mixtures or successively, to starting components which have reactive hydrogen atoms, such as water, ammonia, alcohols or amines, e.g. ethylene glycol, propylene glycol- (1,3) or -(1,2), pentamethylene glycol, hexane diol, decamethylene glycol, trimethylolpropane, 4,4'-dihydroxy-diphenylpropane, aniline, ethanolamine, ethylenediamine, di-(β-hydroxypropyl)-methylamine, di-(β-hydroxyethyl)-aniline or hydrazine, or they may be prepared from hydroxyalkylated phenols, such as O,O-di-(β-hydroxyethyl)-resorcinol.

Sucrose polyethers, such as the compounds described, for example, in German Auslegeschrift Nos. 1,176,358 and 1,064,938 may also be used as component (a). It is frequently preferred to use polyethers which contain predominantly primary OH groups (up to 90%, by weight, based on all the OH groups present in the polyether). Polyethers which are modified with vinyl polymers, e.g. the compounds obtained by the polymerisation of styrene or acrylonitrile in the presence of polyethers (U.S. Pat. Nos. 3,383,351; 3,304,273; 3,523,093 and 3,110,695 and German Pat. No. 1,152,536), and polybutadienes containing OH groups are also suitable.

Among the preferred components (a) are also included polyacetals, e.g. the compounds which may be obtained from the reaction of glycols, such as diethylene glycol, triethylene glycol, 4,4'-dioxethoxydiphenyldimethylmethane and hexane diol, with formaldehyde (suitable polyacetals may also be prepared by the polymerisation of cyclic acetal), in particular also polyoxymethylenes, e.g. copolymers of formaldehyde or trioxane with 1,3-dioxolane, 1,3-oxothiolane or ethylene oxide; naturally occurring polyacetals, such as cane sugar, invert sugar, starch, dextrin or cellulose and the alkylation, acylation, trans-esterification and degradation products thereof are also suitable; also spirocyclic polyacetals of pentaerythritol and glyoxal.

Other preferred components (a) include: phenol/formaldehyde resins, e.g. those obtained from phenol, t-butyl phenol, cresols, xylenols, resorcinol or diphenylol alkanes by the conventional methods of acid or alkaline condensation, in particular in the presence of excess formaldehyde, and the cyanoethylation and hydrogenation products of these substances.

Hydroxyl polyurethanes and/or hydroxyl polyureas having average molecular weights of from 400 to 15,000 may also be used.

The preferred components (a) also include thiodiglycol and the products obtained by the condensation of thiodiglycol either on its own and/or with other glycols, dicarboxylic acids, formaldehyde or aminocarboxylic acids or amino-alcohols, (the products obtained are polythio mixed ethers, polythio ether esters or polythioether ester amides, depending on the co-components).

Other preferred components (a) include polymercaptals, in particular those obtained from formaldehyde and 1,4-tetramethylene or 1,6-hexamethylene dimercaptan.

The following are among the preferred compounds (a) which contain amino groups: polyamines, such as hexamethylene diamine, melamine, melamine/formaldehyde condensates, α,ω-diamino-caproic acid esters of lower ($C_1$-$C_{17}$) fatty alcohols, tolylene diamines, substituted or unsubstituted diphenyl methane diamines and homologues thereof, hydrogenation products of aromatic diamines and polyamines, aminocaproic acid, polyamidopolyamines which may be obtained, e.g. from adipic acid and hexamethylene diamine, N,N'-dibenzyl-hydrazine, carbodihydrazide and adipic acid dihydrazide; also polyamides with amino end groups, e.g. polydibenzimidazoles and polyimides of pyromellitic acid anhydride and diamines and the known modification products of polyphosphoronitrile chlorides with polyamines.

The preferred components (a) also include, for example, polyamines, such as polyethyleneimines, cyanoethylation and hydroxyalkylation products thereof, in particular reaction products of polyalkylene polyamines with epichlorohydrin; the hydrogenation products of cyanoethylated high molecular weight polyamines and polyhydric alcohols; aniline/formaldehyde resins, and polyether alcohols and polyesters.

Polyesters amides and polyamides may also be used as starting materials (a) for reaction with the uretone imines, for example the predominantly linear condensates obtained from polybasic saturated and unsaturated carboxylic acids or anhydrides thereof and from hydroxycarboxylic acids and polyfunctional saturated and unsaturated amino alcohols, diamines, polyamines and mixtures thereof, in other words reaction products of diamines, such as diaminodiphenyl-methane or -propane, m-xylylene diamine, ethylene diamine, tetra- or hexa-methylene diamine and polycarboxylic acids of the type mentioned above (among the polyesters), dimeric fatty acids and mineral acids of the type of phosphoric acid, phosphorous acid and phosphonic acids; polypeptides of natural or synthetic amino acids, such as glycine, alanine, 4-aminobutyric acid, 6-aminocaproic acid or 17-amino-heptadecanoic acid; polyamides of lactams, in particular, of 6-caprolactam, 1,2-dodecanelactam or 2-pyrrolidone; naturally occurring polypeptides and degradation products thereof, e.g. gelatin or casein; also polyester amides of the abovementioned polycarboxylic acids, polyhydric alcohols and polyamines or of polycarboxylic acids and amino-alcohols, such as ethanolamine, 4-aminobutanol-1, 6-aminohexanol-1 or diethanolamine, or aminophenols.

Also to be included among the preferred components (a) are the condensation products of dicarboxylic acids and hydrazine known as polyhydrazides, the methylene polyamides of dinitriles and formaldehyde, and polysulphonamides, e.g. those obtained from n-hexane-1,6-bissulphonic acid chloride or m-benzene-bis-sulphonic acid chloride and 1,6-hexamethylene diamine.

The preferred components (a) also include aminoplast resins, e.g. those based on urea, thiourea, melamine, dicyandiamide, hexamethylene diurea, ethylene urea, acetylene urea or m-benzene disulphonamide, and modification products thereof with polyols.

The preferred components (a) also include polyureas, e.g. those obtained from hexamethylene diamine or bis-(γ-aminopropyl)-ether by condensation with carbon dioxide, urea or diphenyl carbonate; or from 1,10-decamethylene diamine by condensation with 1,6-hexamethylene-bis-ethyl urethane or by the polyaddition of diamines, such as 4,4'-diaminodiphenylmethane, 4,4'-diaminodiphenyl, 1,8-octamethylenediamine or 2,6-diaminotoluene-4-sulphonic acid sodium to polyisocyanates, such as 1,6-hexamethylene diisocyanate, 2,4-tolulene diisocyanate or 4,4'-diisocyanatodiphenylmethane; polythioureas, e.g. those obtained from hexamethylene diamine or p-xylylene diamine, by condensation with carbon disulphide or trithiocarbonic acid esters or by polyaddition of diamines to diisothiocyanates, e.g. to hexamethylene diisothiocyanate.

The following may also be used as component (a): polyurethanes, e.g. those obtained from low molecular monohydric or polyhydric alcohols such as ethylene glycol, propylene glycol, butane diol, hexane diol, diethylene glycol, triethylene glycol, thiodiglycol, N,N-di-(β-hydroxyethyl)-aniline or -m-toluidine, N-methyl-diethanolamine, hydroquinone-di-(β-hydroxyethyl)-ether, adipic acid-di-(β-hydroxyethyl)-ester, N,N,N',N'-tetra-(2-hydroxypropyl)-ethylene diamine, glycerol, trimethylolpropane, mannitol or glucose, by polyaddition to polyisocyanates, such as hexamethylene diisocyanate, tetramethylene diisocyanate, tolylene diisocyanate, p-phenylene diisocyanate, 4,4'-diisocyanatodiphenylmethane, 1,5-naphthylene diisocyanate, 4,4,4''-triphenyl-methane triisocyanate or 4,4',4''-triisocyanato triphenylthiophosphate; those obtained from high molecular polyhydroxyl compounds such as saturated or unsaturated polyesters, polyethers, polyacetals, polythioethers or polyester amides of the type mentioned above containing hydroxyl groups and optionally also carboxyl groups by the polyaddition of these compounds to polyisocyanates or polyisocyanate donors in the presence of the conventional low molecular weight chain-lengthening agents, such as water, glycols, hydrazines, hydrazides, diamines or amino alcohols; or those obtained from bis-chloroformic acid esters, such as ethylene glycol-bis-chloroformic acid ester or butane diol-1,4-bis-chloroformic acid ester, by condensation with diamines or polyamines, such as ethylene diamine, hexamethylene diamine, bis-(3-aminopropyl)-ether, piperazine, 1,4-diaminocyclohexane, bis-(4-amino-3-methylphenyl)-methane, p-phenylene-diamine or diethylene-triamine.

There should also be mentioned those polymers in which isocyanate-reactive functional groups are produced by a subsequent treatment, e.g. by a grafting reaction or a process of hydrolysis. These polymers include, inter alia, polyvinyl alcohols, partially saponified polyvinyl acetates, partially saponified polyvinyl acetate/polyethylene copolymers, partially saponified polyacrylic acid esters, partially saponified polyvinylidene carbonates, hydrogenation products of ethylene/carbon monoxide copolymers; graft polymers of vinyl compounds, such as vinyl chloride, vinyl acetate or acrylonitrile, on straight- or branched-chain polyethers, on polyacetals or on polymers of the type mentioned above which contain isocyanate reactive groups.

Component (a) may, of course, also consist of a mixture of several substances.

Small quantities of liquid components (a) may be used if other components (a) in the mixture have a sufficiently high softening point so that the resulting mixture may be worked-up together with the polyisocyanato-carbodiimide addition products (b) to produce pulverulent binders.

The components (a) listed above are, of course, only suitable as a basis for the binders, if they have at least two isocyanate reactive or uretone imine reactive groups per molecule.

The compositions of polyisocyanatocarbodiimide addition products (b) with compounds (a) generally have softening points of from 40° to 200° C.

The pulverulent coatings may be produced in suitable mixing apparatus, e.g. stirrer vessels or mixing screws (extruders) and worked-up into powders which may be applied to substrates by the conventional methods, in particular by the electrostatic powder spray process (EPS process).

When heated to temperatures above 130° C., preferably from 150° to 220° C., the lacquer films rapidly harden to form hard, smooth coatings.

The parts given below are parts, by weight, and the percentages are percentages, by weight, unless otherwise indicated.

EXAMPLES (A₁) Preparation of cross-linking agents

The melting points of the substances in Examples 1 to 14 were determined by the capillary method in a melting point apparatus according to Dr. Tottoli.

Example 1

444 g of 1-isocyanatomethyl-5-isocyanato-1,3,3-trimethylcyclohexane and 0.4 ml of a mixture of 1-methyl-1-phospha-2-cyclopentene-1-oxide and 1-methyl-1-phospha-3-cyclopentene-1-oxide are dissolved in 336 g. of xylene and heated to the reflux temperature under nitrogen until, in the course of two hours, 28 liters of carbon dioxide have been evolved. The solution is then freed from solvent in a rotary evaporator at ca. 50° C./0.07 Torr. A highly viscous resin is obtained which when left to stand becomes hard and capable of being crushed to a powder. M.p. 121°–130° C.

Uretone imine: 17%; isocyanate: 9%; carbodiimide: <3%.

Example 2

222 g of 1-isocyanatomethyl-5-isocyanato-1,3,3-trimethylcyclohexane and 0.2 ml of a mixture of 1-methyl-1-phospha-2-cyclopentene-1-oxide and 1-methyl-1-phospha-3-cyclopentene-1-oxide are heated to 160° C. under nitrogen (ca. 3.5 hours) until 20 liters of carbon dioxide have been evolved. The liquid product is poured on a metal sheet where it solidifies at a temperature below 80° C. to a mass which may easily be pulverised. M.p.: 140°–150° C.

Uretone imine: 6%; isocyanate: 4%; carbodiimide: <15%.

Example 3

222 g of 1-isocyanatomethyl-5-isocyanto-1,3,3-trimethylcyclohexane and 0.4 ml of a mixture of 1-methyl-1-phospha-2-cyclopentene-1-oxide and 1-methyl-1-phospha-3-cyclopentene-1-oxide are heated to 160° C. under nitrogen for up to 2 hours, until 16 liters of carbon dioxide have been evolved. The liquid product is poured on a metal sheet where it solidifies at a temperature below 50° C. to a mass which may easily be pulverised. M.p.: 84°–87° C.

Uretone imine: 9%; isocyanate: 10%, carbodiimide: <10%.

Example 4

666 g of 1-isocyanatomethyl-5-isocyanato-1,3,3-triemthyl-cyclohexane are reacted at 160° C. with 283 g of a polyester containing 1.5%, by weight, of hydroxyl groups and prepared from neopentylglycol, trimethylol propane, hexane diol and terephthalic acid. After the addition of 1.2 ml of a mixture of 1-methyl-1-phospha-2-cyclopentene-1-oxide and 1-methyl-1-phospha-3-cyclopentene-1-oxide, the product is heated to 160° C. (ca. 2.5 hours), until 35 liters of carbon dioxide have been evolved. On cooling to a temperature below 85° C., the product solidifies to an easily pulverisable mass which is soluble in methylene chloride. On further heating, it becomes insoluble. M.p.: 98°–105° C.

Uretone imine: 14%; isocyanate: 6%; carbodiimide: <1%.

Example 5

111 g of 1-isocyanatomethyl-5-isocyanato-1,3,3-trimethycyclohexane and 42 g of 4,4'-diisocyanatodiphenylmethane are carbodiimidised in the presence of 0.2 ml of a mixture of 1-methyl-1-phospha-2-cyclopentene-1-oxide and 1-methyl-1-phospha-3-cyclopentene-1-oxide at 160° C. under nitrogen until, within about one hour, 10 liters of carbon dioxide have been formed. The product solidifies at a temperature below 120° C.M.p. 175°–185° C.

Uretone imine: 13%; isocyanate: 9%; carbodiimide: <6%.

Example 6

111 g of 1-isocyanatomethyl-5-isocyanato-1,3,3-trimethylcyclohexane and 15 g of a mixture of 2,4- and 2,6-tolylene diisocyanate (ratio 80:20) are heated to 160° C. under nitrogen in the presence of 0.2 ml of a mixture of 1-methyl-1-phospha-2-cyclopentene-1-oxide and 1-methyl-1-phospha-3-cyclopentene-1-oxide until, within about one hour, 11 liters of carbon dioxide have been formed. When poured out on a metal plate, the product solidifies at a temperature below 100° C.

M.p. 170°–180° C.

Uretone imine: 11%; isocyanate: 4%, carbodiimide: <12%.

Example 7

70 g of 1-isocyanatomethyl-5-isocyanato-1,3,3-trimethylcyclohexane are heated to 160° C. in the presence of 0.84 ml of a mixture of 1-methyl-1-phospha-2-cyclopentene-1-oxide and 1-methyl-1-phospha-3-cyclopentene-oxide until, within about ½ hour, 3 liters of carbon dioxide have been formed. 14.35 g of 1,2,4-triazole are then added to 120° C. and the reaction mixture is maintained at this temperature for 10 minutes. The product is then poured out on a metal sheet where it solidifies at a temperature below 60° C.

M.p. 80°–90° C. Uretone imine: 8%; isocyanate: 5%; carbodiimide: <3%.

Example 8

0.4 ml of a mixture of 1-methyl-1-phospha-2-cyclopentene-1-oxide and 1-methyl-1-phospha-3-cyclopentene-1-oxide is added to 168 g of hexamethylene diisocyanate. The mixture is heated at 180° C. until, within 40 minutes, 12 liters of carbon dioxide have been formed. It is then poured out on a metal plate where it solidifies to form a mass which may be milled.

M.p. 172°–176° C. Uretone imine: 25%; isocyanate: 15%; carbodiimide: <2%.

Example 9

560 g of 1-isocyanatomethyl-5-isocyanato-1,3,3-trimethylcyclohexane are reacted with 53.2 g of methanol at 50° C. 6.7 g of a mixture of 1-methyl-1-phospha-2-cyclopentene-1-oxide and 1-methyl-1-phospha-3-cyclopentene-1-oxide are then added and the whole mixture is slowly heated to 140° C. After the evolution of 34 liters of carbon dioxide within a period of 5 hours, the product is cooled to room temperature. It solidifies at a temperature below 50° C. to a mass which is readily pulverised. M.p. 70°–75° C. Uretone imine: 4%, isocyanate: 1%; carbodiimide: <9%.

Example 10

560 g of 1-isocyanatomethyl-5-isocyanato-1,3,3-trimethylcyclohexane are reacted with 36 g of methanol at 50° C. After the addition of 6.7 g of a mixture of 1-methyl-1-phospha-2-cyclopentene-1-oxide and 1-methyl-1-phospha-3-cyclopentene-1-oxide, the reaction mixture is slowly heated to 160° C. After the evolution of 39 liters of carbon dioxide within 2.5 hours, the product is poured on a metal sheet, where it solidifies to a readily pulverised mass at a temperature below 50° C.

M.p. 82°–90° C. Uretone imine: 6%; isocyanate: 2%; carbodiimide: <10%.

Example 11

70 g of 1-isocyanatomethyl-5-isocyanato-1,3,3-trimethylcyclohexane and 14.35 g of 1,2,4-triazole are dissolved in 250 ml of xylene. To this mixture are added 0.84 g of a mixture of 1-methyl-1-phospha-2-cyclopentene-1-oxide and 1-methyl-1-phospha-3-cyclopentene-1-oxide, and the solution is heated to the reflux temperature. 4 liters of carbon dioxide have been evolved at the end of 10 hours. The mixture is concentrated by evaporation on a rotary evaporator at a pressure of 0.1 Torr. A readily pulverised product is obtained. M.p. 64°–72° C.

Uretone imine: 6%; isocyanate: 2%; carbodiimide: <6%.

Example 12

420 g of 1-isocyanatomethyl-5-isocyanato-1,3,3-trimethyl-cyclohexane are reacted with 201 g of malonic acid diethyl ester. The reaction is catalysed by 0.2 g of sodium phenolate. 5 g of a mixture of 1-methyl-1-phospha-2-cyclopentene-1-oxide and 1-methyl-1-phospha-3-cyclopentene-1-oxide are added to this reaction mixture, which is then heated to 160° C. When, within 2 hours, the reaction product has become viscous and 24 liters of carbon dioxide have evolved, the product is poured out on a metal sheet, where it solidifies at a temperature below 50° C. to a readily pulverised mass.

M.p. 130°–140° C. Uretone imine: 3%; isocyanate: 2%; carbodiimide: <6%.

Example 13

50 g of the product from Example 8, together with 222 g of 1-isocyanatomethyl-5-isocyanato-1,3,3-trimethylcyclohexane are heated to 160° C. in the presence of 0.4 ml of a mixture of 1-methyl-1-phospha-2-cyclopentene-1-oxide and 1-methyl-1-phospha-3-cyclopentene-1-oxide until, within 3 hours, 16 liters of carbon dioxide have been evolved. The product is poured out on a metal sheet where it solidifies at a temperature below 110° C. M.p. 150°–155° C.

Uretone imine: 13%; isocyanate: 7%; carbodiimide: <8%.

Example 14

53 g of hexamethylene diisocyanate and 14.35 g of 1,2,4-triazole are dissolved in 250 ml of xylene. To this mixture is added 0.84 g of a mixture of 1-methyl-1-phospha-2-cyclopentene-1-oxide and 1-methyl-1-phospha-3-cyclopentene-1-oxide, and the solution is heated to the reflux temperature. When, after two hours, 2.5 liters of carbon dioxide have been evolved, the mixture is concentrated by evaporation in a rotary evaporator at a pressure of 0.1 Torr. A pulverisable product is obtained. M.p.: 130°–140° C.

Uretone imine: 13%; isocyanate: 8%; carbodiimide: <1%.

Example 15

(B₁) Preparation of a powder lacquer

A finely divided preliminary mixture is first prepared from the required components, i.e. 85 g of a branched-chain terephthalate polyester obtained from terephthalic acid, neopentyl glycol, hexane diol and trimethylolpropane (1.5% OH) and 15 g of the cross-linking agent from Example 1 together with 40 g of titanium dioxide as pigment. A commercial copolymer of butyl acrylate and 2-ethylhexyl acrylate is used as levelling agent (from 1 to 2%, based on the binder). It is incorporated in the form of a so-called "master batch", i.e. 100 parts of the polyester and 10 parts of the levelling agent are melted together and then size reduced when solidified.

The mixture is homogenised in the commercial two-shaft self-cleaning extruder. The jacket temperature is adjusted so that the outflow temperature of the melt is ca. 125° C. The melt cake may either be left to stand or, as is more common in practice, it may be rapidly cooled in a continuously operating squeezing and cooling apparatus. When it has cooled to from 20° to 30° C., it is first coarsely milled and the fine milled and fan cooled at the same time. The fine powder obtained is then freed from coarser particles larger than about 0.09 mm by wind sifting or mechanical screening.

(C₁) Application of the powder lacquer obtained according to (B₁)

Using the powder lacquer produced according to (B₁), steel sheets 0.5 mm in thickness which have been pre-treated with zinc phosphate are coated in an electrostatic powder spray plant and the samples are then heated to 200° C. for 15 minutes. Films having a thickness of ca. 0.060 mm are obtained.

Elasticity tests:
1. Elasticity test by Erichsen cupping according to DIN 53 156: 10 mm
2. Grid section according to DIN 53 151-apparatus Gt C: 0 (=fault free, optimal)
3. Pencil hardness according to DIN 46 450: 3H
4. Gloss according to Gardner 60°: 79%
5. Levelling: good, light structure.

The knife test produces a tough elastic shaving and confirms the excellent adherence in the grid section test.

The solvent resistance also indicates good chemical cross-linking. The lacquers are resistant to toluene, ethyl glycol acetate and acetone and may be exposed to the action of these solvents for several minutes before the surface begins to soften. The coating does not dissolve.

(A₂) Preparation of cross-linking agents

The softening points of the substances of Examples 16 to 24 were determined by differential thermoanalysis.

Example 16

111 g (0.5 mol) of isophorone diisocyanate and 0.06 g of "1-methyl-phospholine oxide" 'a mixture of 1-methyl-1-phospha-2- and -3-cyclopentene-1-oxide) were heated to 160° C. with stirring in a reaction vessel which had been flushed with nitrogen. 5.6 liters (50% of the theoretical amount) of carbon dioxide are released within approximately 2 hours. The contents of the flask are then cooled to 120° C. and poured out. The product solidifies within several hours.

The product shows two endothermal effects in differential thermoanalysis: An absorption of heat observed at from 70° to 75° C. may be attributable to the softening of the sample and a more vigorous absorption of heat with a maximum at about 145° C. may be attributed to the reformation of isocyanate groups.

To determine the isocyanate content, a known quantity of the product is heated in chlorobenzene for a few minutes. A clear solution is obtained. When this has cooled to room temperature, di-n-butylamine is added so that the isocyanate groups may be determined by titration. The isocyanate content is 13%.

If the evolution of $CO_2$ described above is carried out at 200° C. instead of 160° C., the reaction may be terminated after ca. 10 minutes by cooling to 120° C.

Example 17

2886 g of isophorone diisocyanate (13 mol), 14 g of "1-methyl-phospholine oxide" and 21.6 g of p-toluene sulphonic acid amide are heated to 160° C. with stirring. 192.2 liters of carbon dioxide (66% of the theoretical amount) are liberated in ca. 6 hours. The reaction mixture is then cooled to 115° C. and poured out when it has an isocyanate content of ca. 16.0%. On cooling to room temperature, a solid product is obtained which according to differential thermoanalysis softens at 77° C. When a 65% solution in ethyl glycol acetate is prepared from this product at 130° C. and then cooled to 20° C., the viscosities measured by the outflow time (DIN 4 cup: DIN 53 211) are as follows:

| after hours | outflow time |
| --- | --- |
| 0 | 45 sec |
| 1 | 49 |
| 2.5 | 50 |
| 23 | 100 |
| 71 | 489 |
| 170 | gels |

A mixture solidified to a rubbery mass which is insoluble in the cold, even in chlorobenzene, is obtained after 170 hours. When the mixture is heated to 110° C. for some time with chlorobenzene, a clear solution is obtained which has an isocyanate content determined by titration of 14% (based on the solid substance put into the process.)

Example 18

111 g of isophorone diisocyanate (0.5 mol) and 0.06 g of "1-methyl-phospholine oxide" are heated to 160° C. with stirring. 7.4 liters (66% of the theoretical amount) of $CO_2$ are evolved within ca. 4 hours. The reaction mixture is cooled to 120° C., 3.3 g of tin dioctoate are added, and the mixture is poured out. The solid substance obtained on cooling has an isocyanate content of 14%.

Example 19

111 g (0.5 mol) of isophorone diisocyanate are heated to 80° C. 15.5 g (0.25 mol) of ethylene glycol are added dropwise with stirring and the mixture is stirred for ca. 5 hours at from 80° to 90° C. until it has an isocyanate content of 17%. 0.24 g of "1-methylphospholine oxide" are then added and 3.7 liters (66% of the theoretical amount) of carbon dioxide are released by heating to from 160° to 180° C. A brittle solid containing 4.3% of NCO and having a softening point of ca. 99° C. (DTA) is obtained on cooling.

If the release of 3.7 liters of $CO_2$ from isophorone diisocyanate is first carried out at 160° C. in the presence of 0.06 g of "1-methylphospholine oxide", the reaction mixture is then cooled to 100° C. and 15.5 g of ethylene glycol are added and the temperature raised to from 120° to 130° C., the solid obtained on cooling has an isocyanate content of 6.5% and a softening point of 100° C. (DTA).

Example 20

7.4 liters (66% of the theoretical amount) of carbon dioxide are released from a mixture of 131 g (0.5 mol) of 4,4'-diisocyanatodicyclohexylmethane, 0.39 g of "1-methyl-phospholine oxide" and 0.98 g of p-toluene sulphonic acid amide in about 6 hours at 160° C. The mixture is then poured out. A solid having an isocyanate content of ca. 10% and a softening point of ca. 52° C. (DTA) is obtained on cooling.

Example 21

A mixture of 88.2 g (0.4 mol) of isophorone diisocyanate, 17.4 g (0.1 mol) of a mixture of toluene-2,4-/2,6-diisocyanate isomers (ratio 65:35) and 0.05 g of "1-methyl-phospholine oxide" are stirred for ca. 3 hours at 160° C., during which time 7.4 liters of $CO_2$ (66% of the theoretical amount) are evolved. The solid resin obtained on cooling softens at 65° C. (DTA) and contains 16% NCO.

Example 22

168 g (1 mol) of hexamethylene diisocyanate and 0.34 g of "1-methyl-phospholine oxide" are stirred at 160° C. for ca. 3 hours, until 9 liters (40% of the theoretical amount) $CO_2$ have been evolved. The product is initially a thin liquid when cooled, but solidifies to a rubbery state after some time and has an iscyanate content of ca. 22%.

Example 23

A mixture of 177.6 g (0.8 mol) of isophorone diisocyanate, 33.6 g (0.2 mol) of hexamethylene diisocyanate and 1 g of "1-methyl-phospholine oxide" is stirred at from 140° to 155° C. for ca. 30 minutes. 14.8 l (66% of the theoretical amount) of $CO_2$ are evolved during this time. The contents of the flask solidify in a vitreous form on cooling and have an isocyanate content of 14.5%.

Example 24

2886 g (13 mol) of isophorone diisocyanate and 1.4 g of "1-methyl-phospholine oxide" are maintained at 160° C. for ca. 6 hours, with stirring, until 192.2 liters (66% of the theoretical amount) $CO_2$ have been released. The reaction mixture is then cooled to 120° C. and poured out. The solid obtained on cooling has an isocyanate content of 16% and shows two endothermal effects in differential thermoanalysis: The softening point is found at from 70° to 80° C. and reformation of isocyanate groups occurs at from 140° to 150° C.

The infra-red spectrum of the solid cross-linking component shows absorption bands which are characteristic of isocyanate groups (2240 $cm^{-1}$), uretone imine groups (1725 $cm^{-1}$ and 1350 $cm^{-1}$) and carbodiimide groups (2120 $cm^{-1}$).

Example 25 (Comparison)

When 0.09 g of "1-methyl-phospholine oxide" is added to 174 g (1 mol) of an isomeric mixture of tolylene 2,4/2,6-diisocyanate (ratio of isomers 65:35), evolution of $CO_2$ takes place at room temperature and a foamy product which is free from uretone imine groups and unusable as cross-linking component is finally obtained.

PREPARATION OF PULVERULENT COATINGS COMPOUNDS

Examples 26 and 27

A polyester having the acid number 4 and hydroxyl number 50, a viscosity equivalent to 110 seconds measured by the outflow time (40% in cyclohexanone, DIN 53 211) and a softening point of from 60° to 63° C. (DTA) is prepared by a conventional method from 181 parts of trimethylolpropane, 1464 parts of neopentyl glycol, 212 parts of hexane-1,6-diol, 2689 parts of terephthalic acid and 2 parts of di-n-butyl tin oxide.

The compositions described in the following Table are prepared from this polyester and the cross-linking component from Example 24 with the addition of pigment and levelling agent, and the compositions are intimately mixed in an edge runner mixer:

| Components | Example 26 (parts) | Example 27 (parts) |
|---|---|---|
| Polyester | 50.6 | 44.6 |
| Cross-linking component | 8.9 | 14.9 |
| Rutile titanium dioxide pigment | 39.9 | 39.9 |
| Levelling agent from Example 5 | 0.6 | 0.6 |

These mixtures are homogenised in a two-shaft extruder at 80 revs/min, a residence time of ca. 45 seconds and a jacket temperature of 100° C. The outflow temperature is 118° C.

After cooling, the material is milled in a pin mill and then screened. The fraction of particles below 90μ is applied to degreased iron sheets by means of an electrostatic spray installation at a voltage of 60 kV and stoved for 15 minutes at 200° C.

The following results are obtained:

|  | Example 26 | Example 27 |
|---|---|---|
| Layer thickness | 52–53/μ | 56–58/82 |
| Elasticity according to Erichsen | 10 mm | 10 mm |
| Grid section characteristics | 0 | 0 |
| Resistance to rubbing 50 times with wadding steeped in acetone | resistant | resistant |

Example 28

85 parts of a polyacrylate resin prepared according to German Offenlegungsschrift No. 2,600,318 from 30 parts of styrene, 36 parts of methyl methacrylate, 20 parts of butyl acrylate, 13 parts of hydroxypropyl methacrylate and 1 part of acrylic acid (resin characteristics: hydroxyl number 50; acid number 10; molecular weight $M_w$: 20,000, $M_n$: 10,000; softening point ca. 60° C. (DTA)) are worked-up with 15 parts of the cross-linking component from Example 19 and 1 part of levelling agent analogous to that of Example 15 to form an unpigmented pulverulent coating composition as described in Examples 26 and 27, and this coating compound is then applied to degreased metal sheets and stoved at 200° C. for 30 minutes. The clear lacquers obtained are hard and acetone-resistant.

We claim:

1. Binders for pulverulent coating compositions consisting of:
    (a) from 25 to 95%, by weight, preferably from 50 to 95%, by weight, of at least one monomer, oligomer or polymer containing hydroxyl, urethane, carboxyl, mercapto, amino, amide, urea or thiourea groups and having a glass transition temperature of from 40° to 200° C. (determined by differential thermoanalysis); and
    (b) from 5 to 75%, by weight, preferably from 5 to 50%, by weight, of at least one blocked polyisocyanate having a melting point of from 40° to 220° C., preferably from 60° to 180° C.; the percentages of (a) and (b) adding up to 100;

characterised in that the cross-linking agent (b) contains at least one uretone imine group per molecule.

* * * * *